United States Patent
Townsley et al.

(10) Patent No.: US 8,204,080 B2
(45) Date of Patent: *Jun. 19, 2012

(54) TECHNIQUES FOR ENCAPSULATING POINT TO POINT (PPP) OVER ETHERNET FRAMES

(75) Inventors: William Mark Townsley, Nashville, TN (US); Iain T. Lockyer, Victoria (AU)

(73) Assignee: Cisco Technology, Inc., San Jose, CA (US)

(*) Notice: Subject to any disclaimer, the term of this patent is extended or adjusted under 35 U.S.C. 154(b) by 135 days.

This patent is subject to a terminal disclaimer.

(21) Appl. No.: 12/431,024

(22) Filed: Apr. 28, 2009

(65) Prior Publication Data

US 2010/0271976 A1 Oct. 28, 2010

Related U.S. Application Data

(63) Continuation of application No. 11/113,086, filed on Apr. 22, 2005, now Pat. No. 7,525,972.

(51) Int. Cl.
*H04J 3/16* (2006.01)

(52) U.S. Cl. .......... 370/470; 370/229; 709/230

(58) Field of Classification Search .......... 370/470, 370/472, 474, 476, 229–235
See application file for complete search history.

(56) References Cited

U.S. PATENT DOCUMENTS

| | | | |
|---|---|---|---|
| 5,970,066 A | 10/1999 | Lowry et al. | |
| 6,101,180 A | 8/2000 | Donahue et al. | |
| 6,141,339 A | 10/2000 | Kaplan et al. | |
| 6,212,190 B1 * | 4/2001 | Mulligan | 370/400 |
| 6,973,097 B1 * | 12/2005 | Donzis et al. | 370/470 |
| 7,684,440 B1 * | 3/2010 | Maufer et al. | 370/476 |
| 2002/0110124 A1 * | 8/2002 | Fujita | 370/389 |
| 2002/0147826 A1 * | 10/2002 | Sultan | 709/230 |
| 2003/0053443 A1 | 3/2003 | Owens | |
| 2003/0118047 A1 | 6/2003 | Collette et al. | |
| 2003/0131079 A1 | 7/2003 | Neale et al. | |

(Continued)

FOREIGN PATENT DOCUMENTS

EP 1872500 1/2008

(Continued)

OTHER PUBLICATIONS

John Fitzgibbon, "Accommodating an MTU of 1500 in PPPoE," draft-ietf-pppext-mtu-1500-00.txt, Publisher: ietf.org, Published in: Internet, Jan. 1, 2005, 3 pages.

(Continued)

*Primary Examiner* — Andrew Lai
*Assistant Examiner* — Juvena Loo
(74) *Attorney, Agent, or Firm* — Patent Capital Group

(57) ABSTRACT

Techniques for negotiating Point-to-Point Protocol (PPP) sessions over an Ethernet network include receiving configuration data that indicates a first node is connected to a second node thorough an Ethernet network that supports Ethernet frame payload sizes larger than 1500 octets. Request data is received at the first node from the second node. The request data indicates a request for PPP communications between the first node and the second node using a requested PPP payload size greater than 1492 octets. A particular PPP payload size greater than 1492 octets is determined. Response data is sent from the first node to the second node. The response data indicates that the particular PPP payload size greater than 1492 octets is to be used for PPP communications between the first node and the second node. These techniques allow better utilization of Ethernet Jumbo, Giant and Baby Giant frames.

23 Claims, 5 Drawing Sheets

U.S. PATENT DOCUMENTS

| | | | |
|---|---|---|---|
| 2004/0052263 A1 | 3/2004 | Xu | |
| 2004/0133700 A1* | 7/2004 | De Clercq et al. | 709/242 |
| 2005/0039212 A1 | 2/2005 | Baran et al. | |
| 2005/0228885 A1* | 10/2005 | Winfield et al. | 709/226 |

FOREIGN PATENT DOCUMENTS

| | | |
|---|---|---|
| WO | WO 02/076027 | 9/2002 |
| WO | WO 2006/115881 | 11/2006 |

OTHER PUBLICATIONS

L. Mamakos, et al., "A Method for Transmitting PPP Over Ethernet (PPPoE)," Publisher: ietf.org, Published in: Internet, Feb. 1, 1999, 17 pages.

Paul A. Farrell, et al., "Communication Performance over a Gigabit Ethernet Network," 19th IEEE International Performance, Computing, and Communications Conference, Publisher: Ohio Board of Regent Computer Science Enhancement Initiative, Feb. 20, 2000, 9 pages.

Peter Arberg, et al., "Accommodating an MTU/MRU greater than 1492 in PPPoE," PPP Extensions Working Group Internet Draft, Apr. 2005, 12 pages.

PCT International Search Report mailed Aug. 10, 2007 for International Application No. PCT/US06/14439; 1 page.

PCT Written Opinion mailed Aug. 10, 2007 for International Application No. PCT/US06/14439; 4 pages.

PCT International Preliminary Report on Patentability mailed Oct. 23, 2007 for International Application No. PCT/US06/14439; 5 pages.

EPO Jul. 22, 2011 Communication from European Application No. 6750467; 4 pages.

EPO Oct. 3, 2011 Response to EPO Communication dated Jul. 22, 2011 from European Application No. 6750467; 3 pages.

EPO Mar. 19, 2012 Search Report and Written Opinion from European Application No. 6750467; 9 pages.

PCT Mar. 18, 2002 International Search Report from International Application No. PCT/KR01/02029; 2 pages.

* cited by examiner

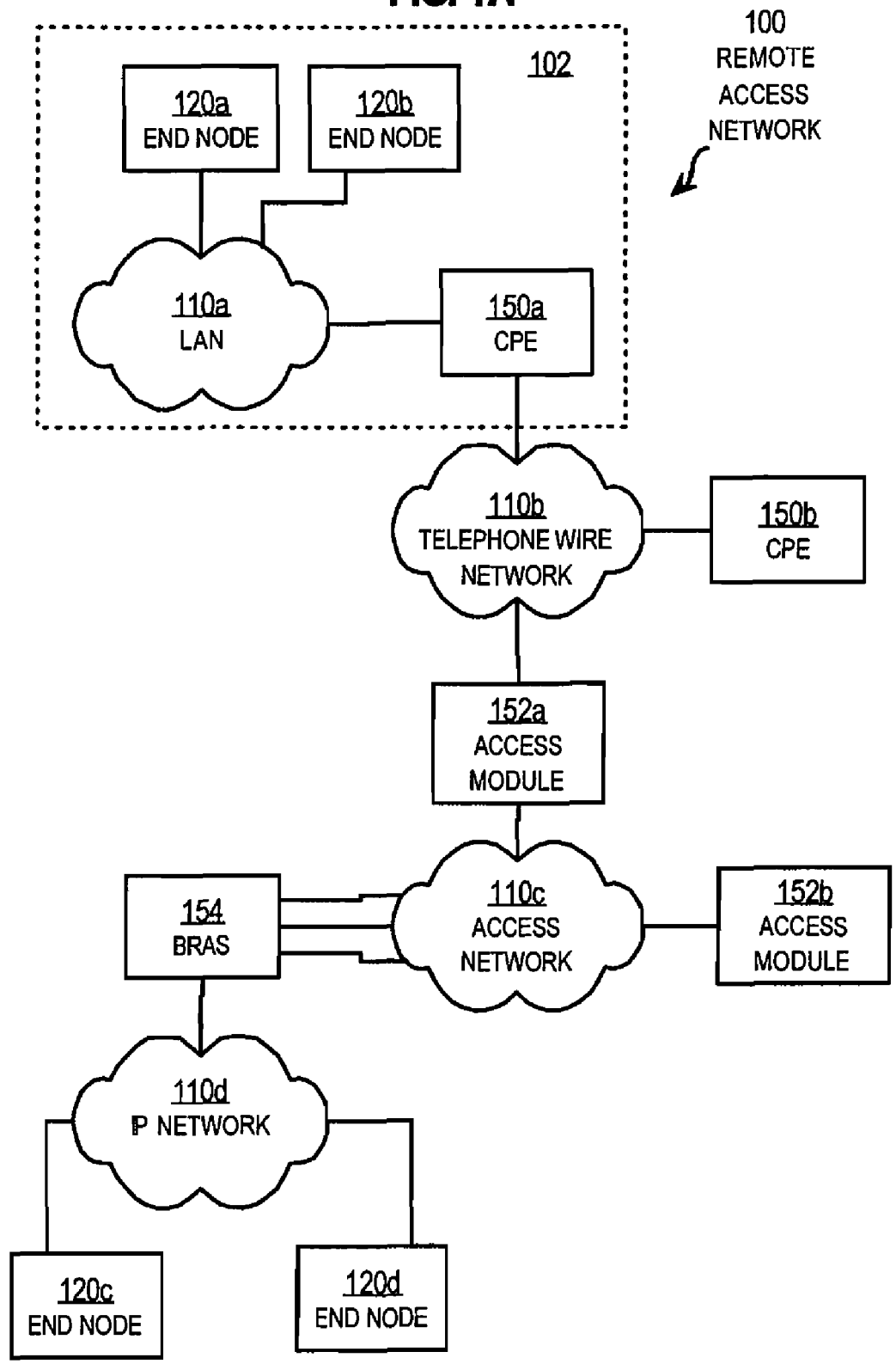

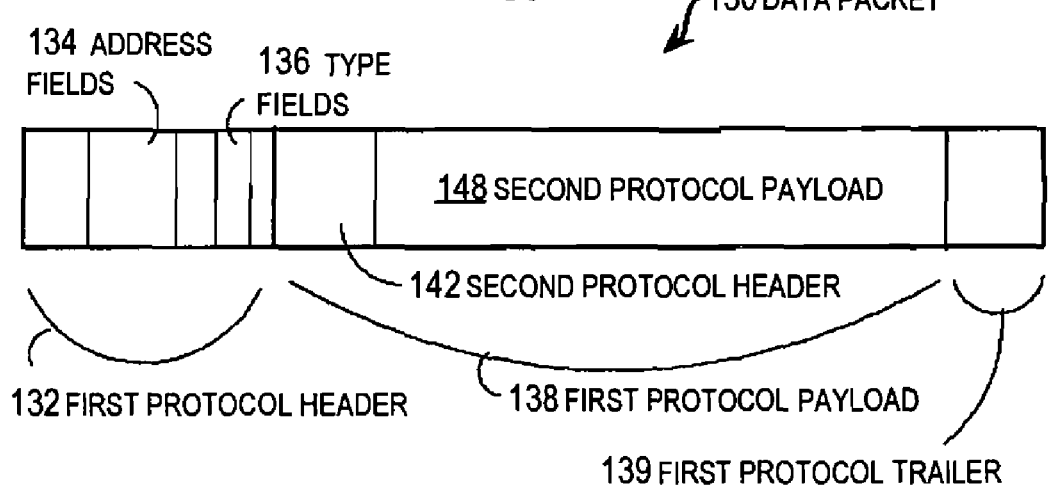
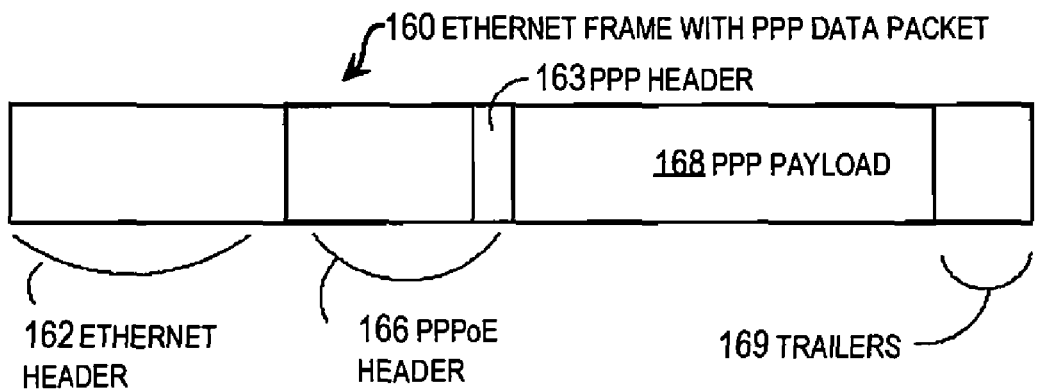
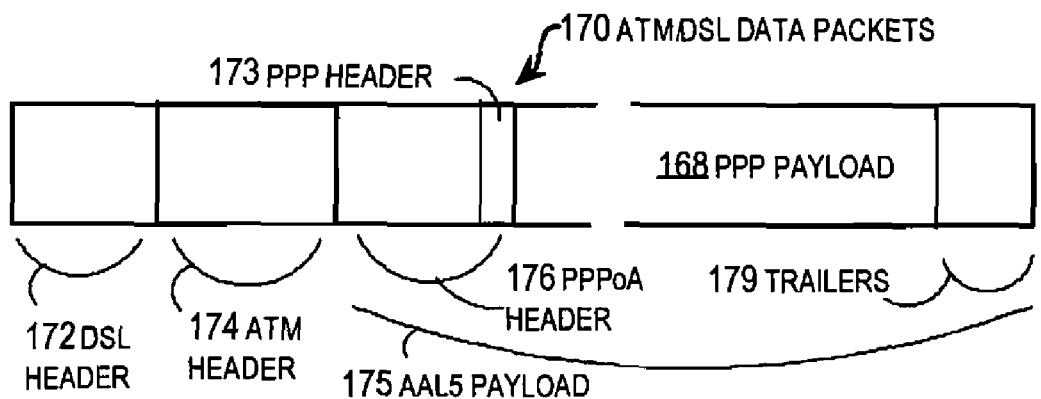

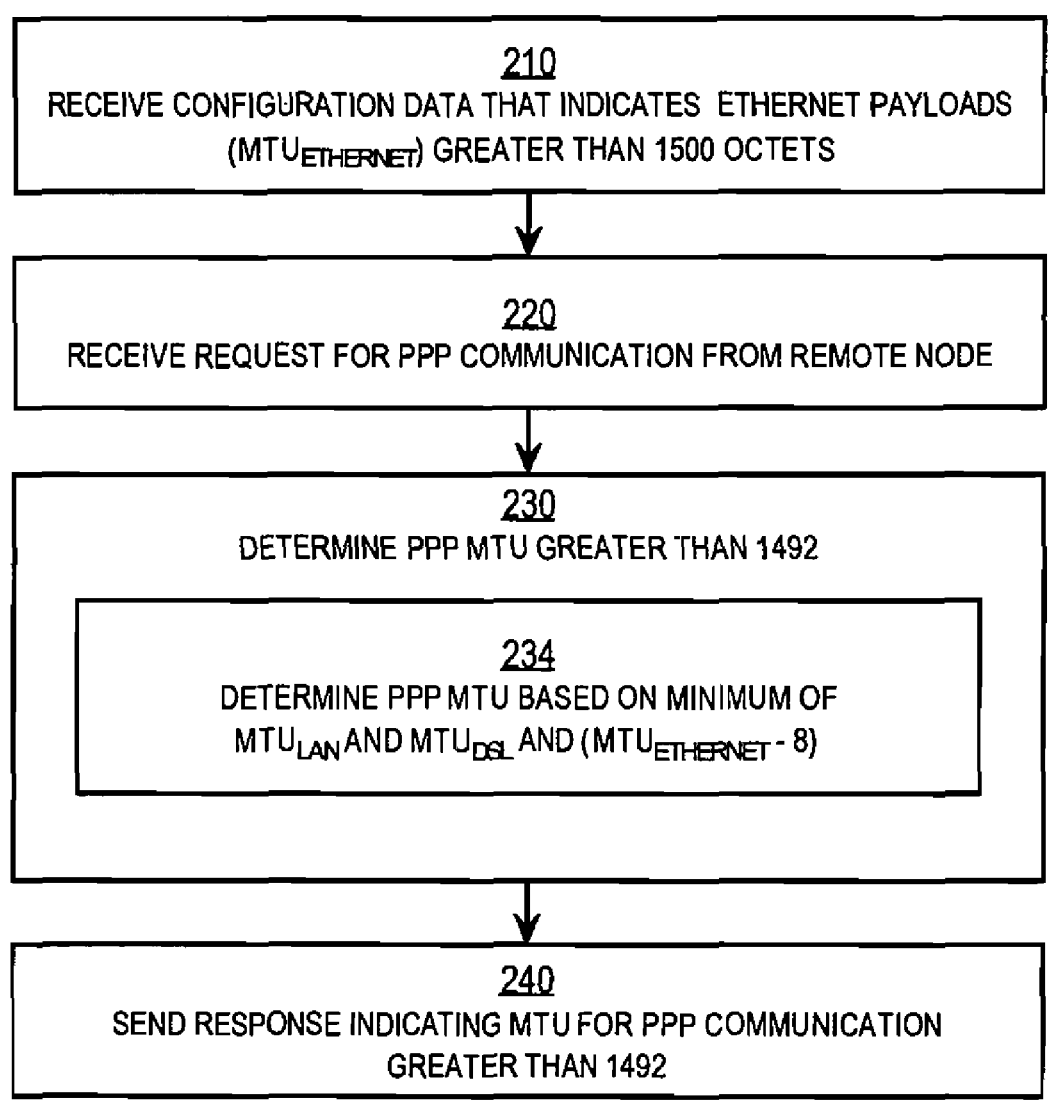

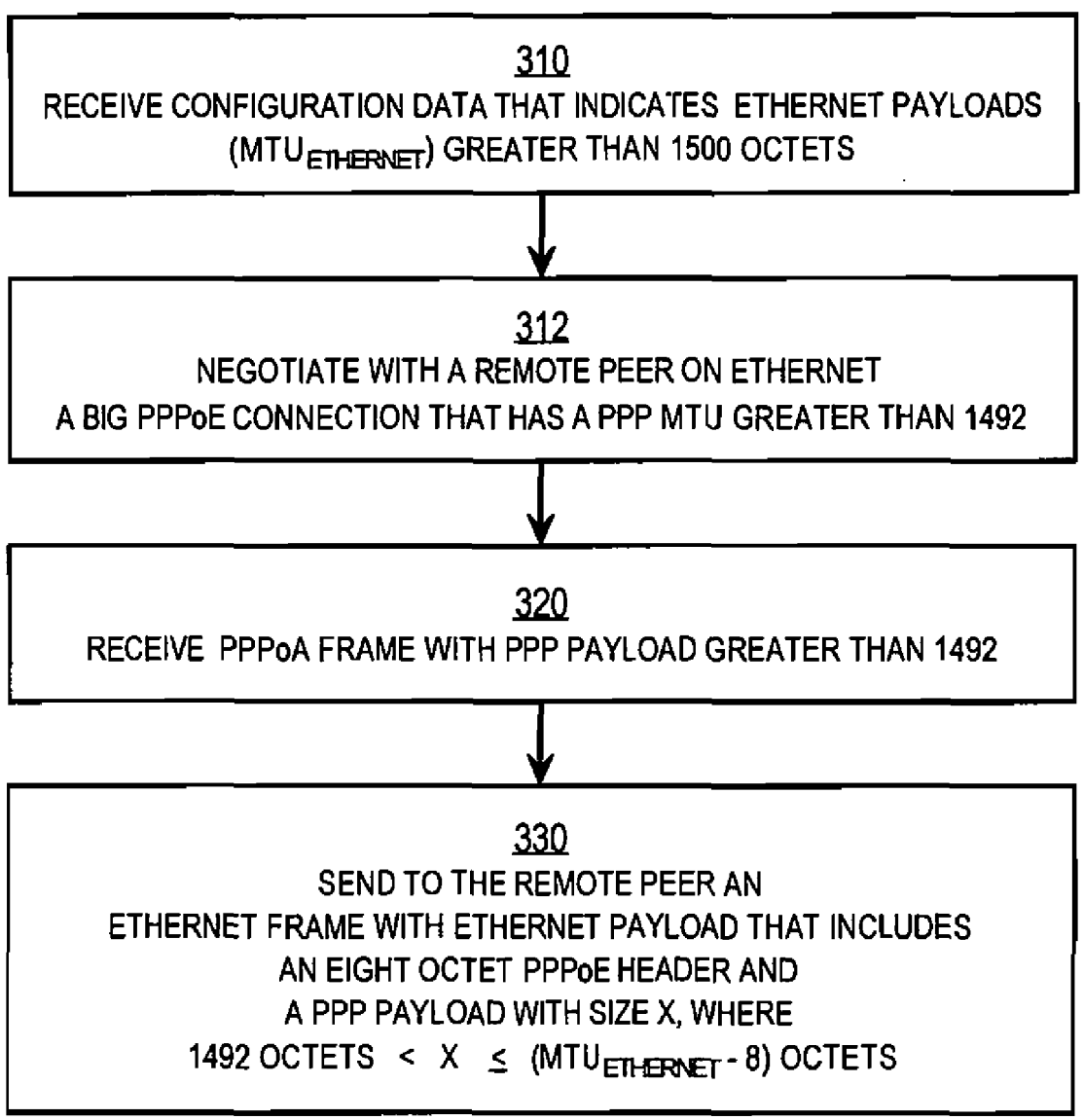

TECHNIQUES FOR ENCAPSULATING POINT TO POINT (PPP) OVER ETHERNET FRAMES

RELATED APPLICATION

This Application is related to, incorporates by reference, and claims the priority benefit of U.S. application Ser. No. 11/113,086 now U.S. Pat. No. 7,525,972, entitled "TECHNIQUES FOR ENCAPSULATING POINT TO POINT PROTOCOL (PPP) OVER ETHERNET FRAMES," filed Apr. 22, 2005.

BACKGROUND OF THE INVENTION

1. Field of the Invention

The present invention relates to using the Point-to-Point Protocol (PPP) over Ethernet frames, and, in particular, using PPP over larger than standard Ethernet frames.

2. Description of the Related Art

Networks of general purpose computer systems connected by external communication links are well known. The networks often include one or more network devices that facilitate the passage of information between the computer systems. A network node is a network device or computer system connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

Some protocols span the layers of the OSI Reference Model. For example, the Ethernet local area network (LAN) protocol includes both layer 1 and layer 2 information. The International Electrical and Electronics Engineers (IEEE) 802.3 protocol, an implementation of the Ethernet protocol, includes layer 1 information and some layer 2 information.

One such layer 2 protocol is the Point to Point Protocol (PPP) between a network node on a local area network and a network node that provides access to a wide area network, such as the Internet. Some protocols, including PPP, pass protocol-related information among two or more network nodes in special control packets that are communicated separately and which include a payload of information used by the protocol itself rather than a payload of data to be communicated for another application or protocol. These control packets and the processes at network nodes that utilize the control packets are said to be in another dimension, a "control plane," distinct from the "data plane" dimension that includes the data packets with payloads for other applications or protocols. For example, authentication information used to authenticate users, negotiations to determine the size of data packets to be exchanged, and layer 3 address assignment information used by routers to direct data packets according to their layer 3 addresses are passed between nodes in PPP control messages in the PPP control plane. PPP provides a standard method for transporting any of multiple protocol data packets (also called frames, datagrams and cells, and used interchangeably herein) over point-to-point links. PPP is defined in an Internet Engineering Task Force (IETF) request for comments document (RFC) numbered 1661, dated July 1994, the entire contents of which are hereby incorporated by reference as if fully set forth herein. Copies of RFC 1661 and other RFCs cited below are available at the World Wide Web domain ietf.org. PPP has been used extensively to connect users at a home site to a remote network using modems and telephone copper loop infrastructure. PPP provides a robust control plane for signaling line characteristics, network protocol parameters, and user- level authentication. In large service provider networks, the user authentication models are generally well entrenched, including, but not limited to, custom-built applications for communicating policy to network equipment and to track billing information.

For applications in which multiple hosts on a shared Ethernet establish PPP sessions to multiple destinations via one or more bridging modems, a PPP over Ethernet (PPPoE) specification has been developed. PPPoE is intended to be used with broadband remote access technologies that provide a bridged Ethernet topology, when access providers wish to distinguish different users connected via the same modem to the remote network. PPP provides this distinction by opening different sessions with different users. PPPoE is described in IETF RFC 2516, the entire contents of which are hereby incorporated by reference as if fully set forth herein.

For some applications, a digital subscription line (DSL) protocol used by bridging modems is combined with an Asynchronous Transfer Mode (ATM) data link layer protocol. A specification for PPP over ATM (PPPoA) has been developed and used extensively in this context. PPPoA for IP data packets in a PPP payload is described in IETF RFC 2364, the entire contents of which are hereby incorporated by reference as if fully set forth herein.

There is a trend among network service providers to move to Ethernet and IP as the only layer two and layer three protocols between end nodes at a user site and end nodes on the remote network to which access is sought. One reason given for this trend is a desire to make use of IP-based quality of service (QoS) capabilities available in access network equipment. Another reason given is to reduce complexity because data packets can be transmitted from one portion of the network infrastructure to another without translating between layer two protocols. Another reason given is that using IP over Ethernet will improve efficiency of bandwidth utilization compared to a mixture of many protocols.

A specific example of problems that arise in migrating remote access to IP over Ethernet infrastructure occurs with DSL/ATM data packets. For many internet service providers (ISPs) an access network lies between a DSL modem bank controlled by a DSL Access Module (DSLAM) and a Broadband Remote Access Server (BRAS) host. This access network is often based on an ATM infrastructure and uses PPPoA to connect remote users to the BRAS. If this access network is converted to a Gigabyte Ethernet infrastructure, PPPoA will fail because Gigabyte Ethernet does not support ATM protocol data packets (called ATM cells).

In one approach to resolving this problem, PPPoA data packets are translated to PPPoE data packets, and then the PPPoE data packets are sent over the Gigabyte Ethernet access network. While suitable in some circumstances, there are several disadvantages to this approach.

One disadvantage is that PPPoE as defined in RFC 2516 imposes a maximum transmission unit (MTU) of 1492 bytes for PPP frames carried over Ethernet. This limitation stems from the standard Ethernet maximum MTU of 1500, and the fact that the PPP and PPPoE header is 8 bytes. PPPoA typically allows a full 1500 bytes, and PPPoA equipment at customer premises may not be compliant in allowing the MTU to be reduced. Some customers stay with PPPoA primarily because of the increased MTU size. Thus even if it is possible to negotiate an MTU of 1492 with PPPoA, it is not adequate for some customers.

Consequently, PPPoA to PPPoE translation in the form being circulated at the time of this writing is not transparent to either the BRAS or the customer premises equipment (CPE).

Based on the foregoing, there is a clear need for techniques that provide PPP functionality over Ethernet infrastructure but that do not suffer the disadvantages of the prior art approaches. In particular, there is a need for techniques that allow Ethernet data packets (also called herein Ethernet frames) to transport PPP payloads in excess of 1492 bytes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates a remote access network, according to an embodiment;

FIG. 1B is a block diagram that illustrates a packet of data communicated over a network;

FIG. 1C is a block diagram that illustrates a PPPoE packet of data communicated over a network;

FIG. 1D is a block diagram that illustrates a PPPoA packet of data communicated over a DSL network;

FIG. 2 is a flow diagram that illustrates at a high level a method for a PPP peer, according to an embodiment;

FIG. 3 is a flow diagram that illustrates at a high level a method for an access module receiving PPPoA, according to an embodiment;

DETAILED DESCRIPTION

Figure 4:
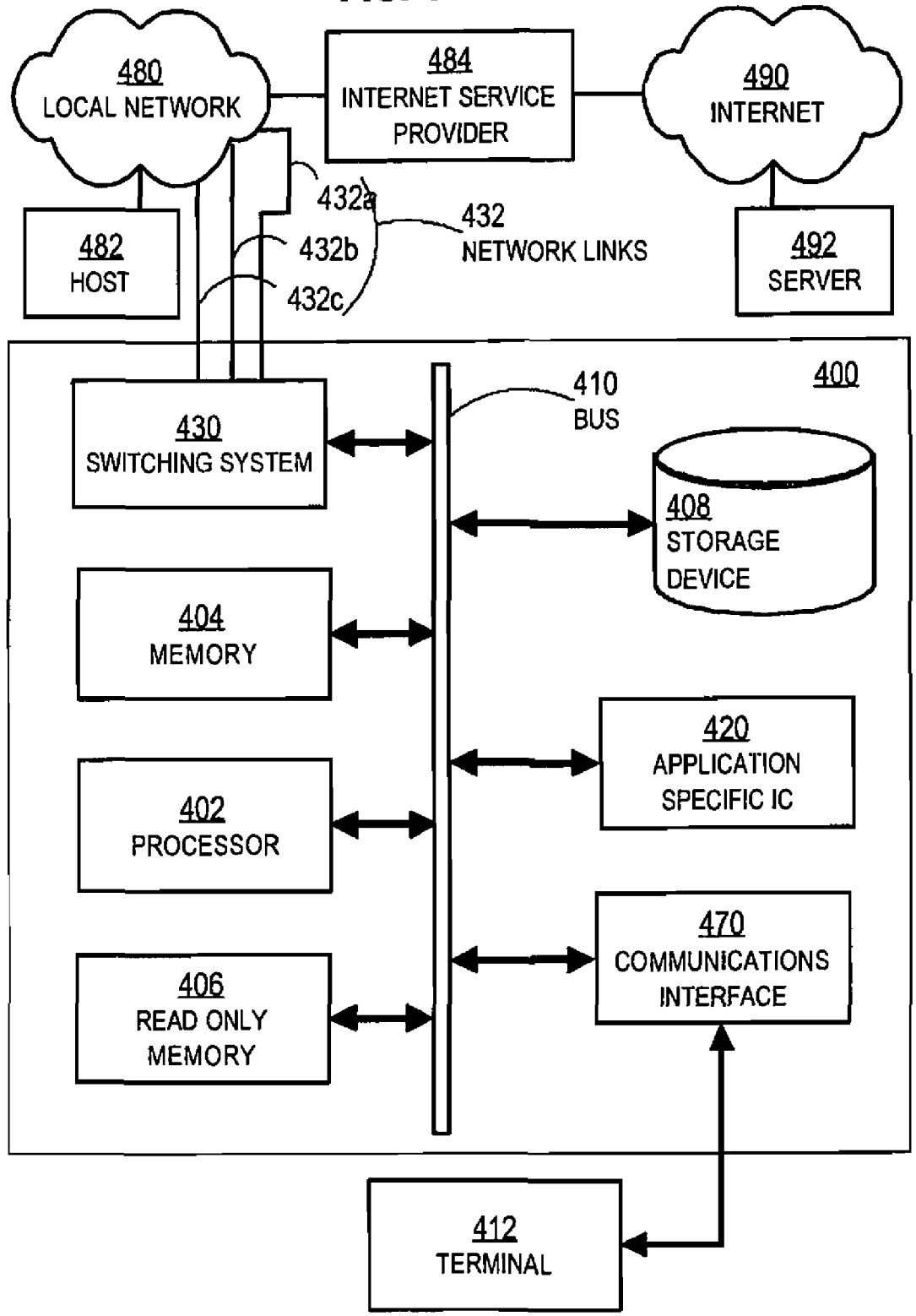
FIG. 4 is a block diagram that illustrates a computer system configured as an intermediate network node upon which an embodiment of the invention may be implemented.

Techniques are described for using Point-to-Point Protocol (PPP) over Ethernet frames. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments are described primarily in the context of using PPP between customer premises equipment (CPE) and a Broadband Remote Access Server (BRAS) over intervening digital subscriber line (DSL) and Ethernet infrastructure. However, embodiments of the invention are not limited to this context. For example, in some embodiments, PPP is used between end nodes on a local area network (LAN) and the BRAS. In other embodiments, PPP is used between any two nodes over a network composed entirely of Ethernet infrastructure. In some embodiments, PPP is used between any two nodes over one or more sub-networks including Ethernet infrastructure connected to one or more sub-networks with other physical layer infrastructure than DSL.

1.0 Network Overview

FIG. 1A is a block diagram that illustrates a remote access network 100, according to an embodiment. A computer network is a geographically distributed collection of interconnected sub-networks (e.g., sub-networks 110a, 110b, 110c, 110d collectively referenced hereinafter as sub-networks 110) for transporting data between nodes, such as computers. A local area network (LAN) 110a is an example of such a sub-network. The network's topology is defined by an arrangement of end nodes (e.g., end nodes 120a, 120b, 120c, 120d, collectively referenced hereinafter as end nodes 120) that communicate with one another, typically through one or more intermediate network nodes, such as a router or switch, that facilitates routing data between end nodes 120 on different sub-networks. As used herein, an end node 120 is a node that is configured to originate or terminate communications over the network. In contrast, an intermediate network node facilitates the passage of data between end nodes. Intermediate network nodes depicted in FIG. 1A include customer premises equipment (CPE) 150a, 150b, access modules 152a, 152b, and Broadband Remote Access Server (BRAS) node 154.

Four sub-networks 110 that are typically involved in remote access are depicted in FIG. 1A. Each sub-network 110 may includes zero or more intermediate network nodes. An IP network 110d is the target for remote access by users at a remote site 102.

To access IP network 110d, a LAN 110a is connected to CPE 150a which serves as a bridge to a network 110b built on a telephone wire infrastructure. In an illustrated embodiment, LAN 110a uses Ethernet infrastructure. Although the remote site 102 includes an Ethernet LAN 110a and two end nodes 120a, 120b, in other embodiments more or fewer end nodes 120 are connected to more or fewer or different LANs 110, such as one or more LANs using Asynchronous Transfer Mode (ATM) infrastructure. In some cases CPE is a telephone modem using acoustic signals over a low-bandwidth legacy telephone system. In an illustrated embodiment, CPE 150a is a digital subscriber line (DSL) modem for establishing a high bandwidth DSL connection over the telephone wire network 110b.

In an illustrated embodiment, sub-network 110b is a network built on telephone wire infrastructure. In other embodiments, sub-network 110b is replaced by another network with wide availability for remote sites, such as a network built on coaxial copper or optical cable or a wireless network. In such embodiments, CPE 150*a* is a cable or optical modem or wireless network interface card for establishing a high bandwidth cable or optical or wireless connection over the sub-network 110*b*. In an illustrated embodiment, the protocol used for communications over sub-network 110*b* is ATM encapsulated in DSL (ATM/DSL).

Communications over sub-network 110*b* from CPE 150*a*, 150*b* terminate at access module 152*a*. Although two CPE 150*a*, 150*b* are depicted connected to sub-network 110*b*, in other embodiments more or fewer CPE are connected to sub-network 110*b*. In an illustrated embodiment, access module 152*a* is a DSL Access Module (DSLAM). In other embodiments, access module 152*a* is a controller for a bank of low-bandwidth modems or a cable or optical access module.

An internet service provider (ISP) typically maintains several access modules 152*a*, 152*b* and an access network 110*c* for connection to the IP network 110*d* through a Broadband Remote Access Server (BRAS) node 154. In many current embodiments, the access network 110*c* is based on an ATM infrastructure, and the base communication protocol is ATM.

FIG. 1B is a block diagram that illustrates a generalized data packet 130 communicated over a network, such as network 100. Each packet typically comprises one or more payloads of data, e.g. payloads 138, 148, each encapsulated by at least one network header, e.g., headers 132, 142, respectively. For example, payloads are encapsulated by appending a header before the payload, sometimes called prepending a header, and sometimes by appending a trailer (or tail) after the payload. Each header 132, 142 is formatted in accordance with a network communication protocol; header 132 is formatted according to a first protocol and header 142 is formatted according to a second protocol. The header 142 for the second protocol is included within the payload 138 of the first protocol. As used herein a header for a particular protocol and its payload constitute a data packet for that protocol and may also be called a cell, frame, datagram or message for that protocol. In some publications data packets for different protocols are distinguished in shorthand by using a different one of the above terms for different protocols, e.g., to refer to Ethernet frames and IP datagrams, but here the terms are used interchangeably.

The header for a protocol typically includes type fields that identify the protocol to which the header belongs and the next protocol in the payload, if any. For example, the header 132 for the first protocol includes type fields 136. The header for a protocol often includes a destination address or a source address, or both, for the information in the payload. For example, the header 132 for the first protocol includes address fields 134 where the source and receiver address for the first protocol is located within the packet 130. As described above, a transmitted data packet's network headers include at least a physical link (layer 1) header, a data-link (layer 2) header, and possibly an internetwork (layer 3) header and possibly a transport (layer 4) header.

The physical (layer 1) header defines the electrical, mechanical and procedural mechanisms for proper capture of the Ethernet frame, but is not captured by a Media Access Controller. The layer 1 header may include a DSL or ATM or Ethernet layer 1 header, or some combination.

The data-link header provides information for transmitting the packet over a particular physical link (i.e., a communication medium), such as a point-to-point link, Ethernet layer 2 link, wireless link, optical link, etc. An intermediate network node typically contains multiple physical links with multiple different nodes. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link. The PPP protocol and header are described in more detail below.

The internetwork header provides information defining the source and destination address within the computer network. Notably, the path may span multiple physical links. The internetwork header may be formatted according to the Internet Protocol (IP), which specifies logical IP addresses of both a source and destination node at the end points of the logical path. Thus, the packet may "hop" from node to node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

As stated above in the background section, PPP is a data link layer protocol, specified in IETF RFC 1661. PPP is comprised of three main components: 1] a method for encapsulating multi-protocol datagrams; 2] a Link Control Protocol (LCP) for establishing, configuring, and testing the data-link connection; and 3] a family of Network Control Protocols (NCPs) for establishing and configuring different network-layer protocols. The link will remain configured for communications until explicit LCP or NCP packets close the link down, or until some external event occurs (e.g., an inactivity timer expires or a network administrator intervenes). The PPP data packet includes a PPP header that indicates the protocol in the PPP payload (e.g., an IP datagram or PPP control plane data), a PPP payload, and a PPP trailer.

In the context of a remote access network, like network 100 depicted in FIG. 1A, the PPP control plane is used to establish a persistent communication channel as a series of point-to-point links from an end node at remote site 102 (e.g., end node 120*a*), or from CPE (e.g., CPE 150*a*), to the remote access server on the target network (e.g., BRAS node 154 on IP network 110*d*). Procedures for establishing and breaking down this persistent channel are well known in the art and are described in RFC 1661. This channel is then used to transport PPP data plane payloads (e.g., IP datagrams) to the remote access server, which extracts the PPP data plane payload and transmits that payload over the target network.

PPP data packets are transmitted over Ethernet according to PPPoE described in IETF RFC 2516. FIG. 1C is a block diagram that illustrates an Ethernet frame with a PPPoE data packet. The Ethernet frame 160 includes an Ethernet header 162 and trailers 169. The trailers 169 include an Ethernet trailer among other trailers. The Ethernet header 162 includes a type field that holds data that indicates a payload with PPPoE. The Ethernet payload includes a PPPoE header 166 and a PPP payload 168 and a PPP trailer. In the illustrated embodiment, the PPP header 163 is included in the PPPoE header 166 and the PPP trailer is included in trailers 169. The PPP payload 168 is thus PPP data plane data or PPP control plane data. A code field in the PPPoE header indicates whether the data packet is a control plane packet, e.g., involved in discovering a new PPP session, or a data plane packet that uses an existing session. The PPP session, if any, is indicated by data in a Session ID field in the PPPoE header 166. The length of the PPP data packet, including PPP header 163, is indicated by data in a Length field in the PPPoE header.

The size of the PPPoE header 166 is eight octets (an octet is 8 binary digits, bits). A byte is a variable number of bits, that is typically 8 bits; a byte is 8 bits in the context of PPPoA and PPPoE). The size of the standard Ethernet payload is 1500 octets. Therefore RFC 2516 specifies that the maximum size of the PPP payload 168 is 1492 octets (in which case there is no PPP trailer) The maximum size of the PPP payload 168 is called the PPP maximum transmission unit (MTU).

PPP data packets are transmitted over ATM according to PPPoA described in IETF RFC 2364. ATM cells are of fixed small size—53 octets, with a 5-octet ATM header and a 48-octet ATM payload. A protocol that allows for larger data packets to be transmitted over ATM is an ATM Adaptation Layer (AAL), such as AAL5 that fragments a large protocol data packet at a sending node for transmission using multiple ATM cells and reassembles the large protocol data packet at a receiving node. An AAL trailer is aligned with the end of the last ATM cell and includes a length field that holds data that indicates the length of the AAL frame. PPPoA utilizes AAL5. FIG. 1D is a block diagram that illustrates a PPPoA packet of data communicated over a DSL network, such as sub-network 110b, in multiple ATM/DSL packets. FIG. 1D depicts the DSL header 172, ATM header 174, and beginning of the AAL5 payload 175 in the first ATM cell, and the end of the AAL5 payload in the last ATM cell.

The beginning of the AAL payload includes the PPPoA header 176 and the start of the PPP payload 168. The end of the AAL frame includes the end of the PPP payload 168 and trailers 179, including any padding to align with the end of the last ATM cell. In the illustrated embodiment, the PPP header 173 is included in the PPPoA header 176 and the PPP trailer is included in trailers 179. The PPP payload 168 is thus PPP data plane data or PPP control plane data. In embodiments that use an ATM virtual connection (VC), the PPPoA header 176 includes only the PPP header 173. In embodiments that use ATM logical link control (LLC), the PPPoA header 176 includes multiple other fields, including a network layer protocol identification (NLPID) field that holds data that indicates PPP. RFC 2364 for PPPoA specifies the PPP MTU is 1500 octets.

In a typical arrangement, end nodes 120a, 120b at remote site 102 communicate with end nodes 120c, 120d by directing standard Ethernet frames on a standard Ethernet LAN 110a to CPE 150a. This traffic is allowed to have an Ethernet payload as large as 1500 octets. Maximum payload size on LAN 110a is designated hereinafter by the symbol $MTU_{LAN}$. The CPE 150a communicates with a DSLAM 152a over network 110b using PPPoA over DSL with a PPP MTU of 1500 octets. Maximum PPP payload size on network 110b is designated hereinafter by the symbol $MTU_{DSL}$. Thus a standard Ethernet payload can be carried by the data plane PPPoA payload over the DSL network.

The DSLAM 152a communicates with the BRAS over access network 110c using an appropriate protocol with a maximum PPP payload size designated hereinafter by the symbol $MTU_{ACCESS}$. While the access network 110c has previously been an ATM infrastructure that carried PPPoA and thus supports a PPP MTU of 1500, in recent years more ISPs have begun using Ethernet infrastructure for access network 110c. Using PPPoE according to RFC 2516, $MTU_{ACCESS}$ is only 1492. Thus $MTU_{ACCESS}$ is insufficient to accommodate Ethernet LAN payloads of 1500 octets in a data plane PPP payload.

It is assumed for purposes of illustration that access network 110c uses Ethernet infrastructure that support larger than standard Ethernet frames. Larger than standard Ethernet frames include Ethernet Baby Giant frames and Ethernet Jumbo frames. The Ethernet payload MTUs of these frames are 1582 octets and 9198 octets, respectively.

According to the illustrated embodiments of the invention, the restrictions of RFC 2516 are relaxed to allow PPPoE MTU in excess of 1492 if the Ethernet infrastructure supports larger than standard Ethernet frames. The relaxed protocol is called herein Big PPoE to distinguish it from the PPPoE protocol of RFC 2516. According to some embodiments, the eight octets of the PPPoE header are included in the Ethernet payloads so that the PPP payloads are allowed to be as large as the Ethernet payload minus eight. This relationship is given in Expression 1.

$$\text{Big PPoE MTU} = \text{Ethernet MTU} - 8 \quad (1)$$

Thus Big PPoE MTU for Ethernet Baby Giant frames is 1574; and Big PPoE MTU for Ethernet Jumbo Frames is 9190. The Big PPoE MTU for standard Ethernet frames remains at 1492, as specified for PPPoE.

According to the illustrated embodiment, $MTU_{ACCESS}$=Big PPoE MTU for larger than standard Ethernet frames. Thus $MTU_{ACCESS}$ is 1574 for Baby Giant frames and is large enough to accommodate data plane PPP payloads that hold standard Ethernet payloads of 1500 octets sent over LAN 110a.

2.0 Method for Sending PPP Over Ethernet

As noted in the background section there is a trend to migrate the access network 110c or the telephone wire network 110b or the LAN 110a, or some combination to Ethernet or IP over Ethernet. An advantage of such a migration is that messages generated at remote site 102 can be propagated to IP network 110d with less or no effort devoted to translating or repackaging the messages in various protocols.

As stated above in the background section, if one of the sub-networks, such as the access network 110c, is converted to Ethernet, and an upstream sub-network, such as telephone wire network 110b, still uses ATM, then a problem arises because ATM can not be used on Ethernet infrastructure. Thus PPPoA can not be used on the Ethernet sub-network. Translating PPPoA to PPPoE is not desirable for the reasons given above, in the background section.

In the following, methods are described for negotiating PPP payloads larger than the PPPoE limit of 1492 and for using the larger payloads when converting from PPPoA packets.

2.1 Method at a PPP Peer

FIG. 2 is a flow diagram that illustrates at a high level a method 200 for a PPP peer, according to an embodiment. Although steps are shown in a particular order in FIG. 2 and a subsequent flow diagram for purposes of illustration, in other embodiments one or more steps are performed in a different order or overlap in time or are omitted, or are changed in some combination.

In step 210, configuration data is received that indicates the peer is using larger than standard Ethernet frames. Any method may be used to receive this configuration data. In some embodiments, the configuration data is input manually by a network administrator and stored locally or on a remote node. In some embodiments, the data is retrieved from storage locally or remotely. In some embodiments, the data is sent in a message from another node on the network either in response to a message from the peer requesting the data or in an unsolicited message.

For example, configuration data is stored on the BRAS 154, which indicates that the BRAS is connected to multiple CPE 150 through an Ethernet access network 110c that supports Baby Giant Ethernet frames and a DSL network 110b. In an illustrated embodiment, configuration data is stored at the access module 152 (e.g., DSLAM 152a) as one PPP peer and sent, unsolicited, to the BRAS 154 as the other PPP peer when the access module 152 comes on line. The access module 152 sends a Big PPoE control plane message, similar to a PPPoE control plane message, that the larger Ethernet MTU is being used on the access network.

In step 220, a request is received for PPP communications with a remote node. For example a LCP request message is received at BRAS 154 from CPE 150a for PPP communications based on $MTU_{LAN}$. LCP requests and other control plane PPP requests have payloads that are small compared to 1492 octets. It is assumed for purposes of illustration that the LCP request message indicates a value of $MTU_{LAN}$=1500 and therefore indicates a request for PPP MTU of 1500 for PPP communications with the BRAS 154. This request enables the full Ethernet payload on LAN 110a to be used as a data plane PPP payload in communications between CPE 150a and BRAS 154. In another example embodiment, the LCP is received from the access module 152 (e.g., DLSAM 152a) using Big PPoE control plane messages similar to current PPPoE control plane messages.

In some embodiments, the request is generated in response to some external activity. For example, in response to receiving a PPPoA message indicating a PPP connection is desired from a CPE 150 (e.g., CPE 150a) to the BRAS 154, the access module 152 uses LCP in Big PPoE message to generate a request message for a Big PPoE connection between the access module 152 and the BRAS 154.

In some embodiments, steps 210 and 220 are combined, and both the configuration data and the request are received at the PPP peer in the same message, e.g. the same Big PPoE message received at the BRAS 154 from the DSLAM 152a.

In step 230, the peer determines a PPP MTU that is greater than 1492 for communications with the remote node based on the request and the configuration data. In the illustrated embodiment, the PPP MTU is determined based on the MTU of the LAN 110a in the request data and on the values of PPPoA MTU for DSL sub-network 110b ($MTU_{DSL}$) and $MTU_{ACCESS}$ for access sub-network 110c in the configuration data. For example, the PPP MTU is determined according to Expression 2a.

$$\text{PPP MTU} = \text{minimum}(MTU_{LAN}, MTU_{DSL}, MTU_{ACCESS}) \quad (2a)$$

Substituting Expression 1 for $MTU_{ACCESS}$ gives Expression 2b.

$$\text{PPP MTU} = \text{minimum}(MTU_{LAN}, MTU_{DSL}, MTU_{ETHERNET}-8) \quad (2b)$$

In step 234 PPP MTU is determined using Expression 2b. Thus, in the illustrated embodiment, step 230 includes step 234. In embodiments without an intervening DSL network, $MTU_{DSL}$ is omitted from Expression 2b.

According to an example of the illustrated embodiments, $MTU_{LAN}$ and $MTU_{DSL}$ are each equal to 1500 and $MTU_{ETHERNET}$ is greater than 1500 because access network 110c uses larger than standard Ethernet frames. Therefore PPP MTU is greater than 1500−8, i.e., PPP MTU is greater than 1492. For Baby Giant and Jumbo Ethernet frames, $MTU_{ETHERNET}$ is greater than 1582, therefore $MTU_{ETHERNET}-8$ is greater than 1574 and PPP MTU is 1500 according to Expression 2b.

In other embodiments, other values for PPP MTU are determined. For example, in embodiments without an intervening DSL network (in which, for example, the CPE 150a and the access module 152a are the same device), with LAN 110a using Ethernet Baby Giant Frames, with access network 110c using Jumbo Ethernet frames, and with PPP negotiations between the CPE 150a and the BRAS 154, the negotiated PPP MTU is the minimum of ($MTU_{LAN}$, $MTU_{ACCESS}$) =minimum ($MTU_{LAN}$, $MTU_{ETHERNET}-8$)=minimum (1582, 9190)=1582.

In step 240 a response is sent indicating PPP MTU greater than 1492. In the illustrated embodiment, a LCP response message is sent from the BRAS 154 to CPE 150a indicating a PPP MTU of 1500.

2.2 Method at an Access Module

FIG. 3 is a flow diagram that illustrates at a high level a method 300 for an access module receiving PPPoA, according to an embodiment. In this embodiment, PPP communications between CPE 150a and BRAS 154 are supported by access module 152a. The sub-network 110b between CPE 150a and access module 152a uses ATM, thus access module 152a receives PPPoA data packets. The access network 110c between access module 152a and BRAS 154 is an Ethernet subnetwork that supports larger than standard frames. For purposes of illustration, it is assumed that Ethernet access network 110c supports Baby Giant Ethernet frames.

In step 310, configuration data is received that indicates the access network is using larger than standard Ethernet frames. Any method may be used to receive this configuration data, as described above for step 210. For example, configuration data is stored on the access module 152a, which indicates that the access network 110c is an Ethernet access network 110c that supports Baby Giant Ethernet frames, and that CPE 150 are connected through an ATM/DSL network.

In step 312 a Big PPoE connection is negotiated with a PPP peer across an Ethernet framework for an MTU greater than 1492. For example, in the illustrated embodiment, control plane Big PPoE messages are exchanged between the access module 152 (e.g., DSLAM 152a) and the BRAS 154 to indicate that the Ethernet infrastructure supports larger than standard frames (which accomplishes step 210 at the BRAS) and to set up a Big PPoE connection. Steps 230 and 240 are performed as part of this negotiation. As a consequence, the BRAS 154 can later negotiate with the CPE 150 for a PPP MTU greater than 1492. In some embodiments step 312 includes receiving a PPPoA control plane request for a PPP connection between a CPE 150 and the BRAS 154, and negotiating a Big PPPoE connection in response to the PPPoA request.

In step 320, a PPPoA frame is received with a PPP payload greater than 1492 octets. For example, a PPPoA frame is received from CPE 150a with a data plane PPP payload of 1500 octets (e.g., based on a data plane Ethernet payload of 1500 on LAN 110a from end node 120a).

In some embodiments step 312 follows step 320. For example, the Big PPPoE connection is negotiated from the DSLAM 152a to the BRAS in response to the DLAM 152a receiving a first PPPoA frame with a PPP payload greater than 1492 octets.

In step 330, a larger than standard Ethernet frame is sent over the PPP link on an Ethernet network that includes in the data plane Ethernet payload an eight octet PPPoE header and a PPP payload size in the range from greater than 1492 octets up to $MTU_{ETHERNET}-8$. That is, the PPP payload size, in octets, on the Ethernet network satisfies the inequality Expression 3.

$$1492 < \text{PPP payload size} \leq MTU_{ETHERNET}-8 \qquad (3)$$

For example, a Baby Giant Ethernet frame ($MTU_{ETHERNET}=1582$) with an Ethernet payload of 1508 octets is sent over access network 110c over the PPP link from DSLAM 152a toward BRAS 154. The example Ethernet payload includes an 8 octet PPPoE header and a 1500 octet PPP payload that is the same as the PPP payload received in step 320. The PPP payload size 1500 satisfies Expression 3; i.e., the following expression is always true $$1492 < 1500 \leq 1582-8=1574.$$

An advantage of method 300 is that the conversion of PPPoA frames to Ethernet frames is greatly simplified and completely compatible, unlike the conversion of PPPoA to PPPoE under the restrictions of RFC 2516.

3.0 Implementation Mechanisms—Hardware Overview

FIG. 4 is a block diagram that illustrates a computer system 400 upon which an embodiment of the invention may be implemented. The preferred embodiment is implemented using one or more computer programs running on a network node such as a router device. Thus, in this embodiment, the computer system 400 is a network node.

Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, nonvolatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention. Thus, embodiments of the invention are not limited to any specific combination of hardware and software.

The signals transmitted over network link 432 and other networks through communications interfaces such as interface 470, which carry information to and from computer system 400, are exemplary forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
storing configuration data that indicates that a first node is connected to a second node in an Ethernet network that supports Ethernet frame payload sizes greater than 1500 octets, wherein a request for Point-to-Point Protocol (PPP) communications between the first node and the second node includes a PPP payload size greater than 1492 octets; and sending response data that indicates the PPP payload size greater than 1492 octets is to be used for the PPP communications between the first node and the second node.

2. The method of claim 1, wherein the configuration data includes data plane and control plane payload allocations for frames traversing the Ethernet network.

3. The method of claim 1, wherein the first node is a broadband remote access server (BRAS) and the configuration data is stored by the BRAS.

4. The method of claim 1, wherein the second node is a digital subscriber line access module (DSLAM) and the configuration data is stored by the DSLAM.

5. The method of claim 1, wherein a control message is used to send the response data that indicates the PPP payload size to be used for the PPP communications.

6. The method of claim 1, wherein the request is a link control protocol (LCP) message for Point-to-Point Protocol (PPP) communications between the first node and the second node.

7. A system comprising:
means for storing configuration data that indicates that a first node is connected to a second node in an Ethernet network that supports Ethernet frame payload sizes greater than 1500 octets, wherein a request for Point-to-Point Protocol (PPP) communications between the first node and the second node includes a PPP payload size greater than 1492 octets; and
means for sending response data that indicates the PPP payload size greater than 1492 octets is to be used for the PPP communications between the first node and the second node.

8. The system of claim 7, wherein the configuration data includes data plane and control plane payload allocations for frames traversing the Ethernet network.

9. The system of claim 7, wherein the first node is a broadband remote access server (BRAS) and the configuration data is stored by the BRAS.

10. The system of claim 7, wherein the second node is a digital subscriber line access module (DSLAM) and the configuration data is stored by the DSLAM.

11. The system of claim 7, wherein a control message is used to send the response data that indicates the PPP payload size to be used for the PPP communications.

12. The system of claim 7, wherein the request is a link control protocol (LCP) message for Point-to-Point Protocol (PPP) communications between the first node and the second node.

13. A non-transitory media comprising logic that includes code for execution and when executed by a processor operable to perform operations comprising:

storing configuration data that indicates that a first node is connected to a second node in an Ethernet network that supports Ethernet frame payload sizes greater than 1500 octets, wherein a request for Point-to-Point Protocol (PPP) communications between the first node and the second node includes a PPP payload size greater than 1492 octets; and sending response data that indicates the PPP payload size greater than 1492 octets is to be used for the PPP communications between the first node and the second node.

14. The non-transitory media of claim 13, wherein the configuration data includes data plane and control plane payload allocations for frames traversing the Ethernet network.

15. The non-transitory media of claim 13, wherein the first node is a broadband remote access server (BRAS) and the configuration data is stored by the BRAS.

16. The non-transitory media of claim 13, wherein the second node is a digital subscriber line access module (DSLAM) and the configuration data is stored by the DSLAM.

17. The non-transitory media of claim 13, wherein a control message is used to send the response data that indicates the PPP payload size to be used for the PPP communications.

18. An apparatus comprising:
a first node configured to store configuration data that indicates that a first node is connected to a second node in an Ethernet network that supports Ethernet frame payload sizes greater than 1500 octets, wherein a request for Point-to-Point Protocol (PPP) communications between the first node and the second node includes a PPP payload size greater than 1492 octets, the first node further configured to send response data that indicates the PPP payload size greater than 1492 octets is to be used for the PPP communications between the first node and the second node.

19. The apparatus of claim 18, wherein the configuration data includes data plane and control plane payload allocations for frames traversing the Ethernet network.

20. The apparatus of claim 18, wherein the first node is a broadband remote access server (BRAS) and the configuration data is stored by the BRAS.

21. The apparatus of claim 18, wherein the second node is a digital subscriber line access module (DSLAM) and the configuration data is stored by the DSLAM.

22. The apparatus of claim 18, wherein a control message is used to send the response data that indicates the PPP payload size to be used for the PPP communications.

23. The apparatus of claim 18, wherein the request is a link control protocol (LCP) message for Point-to-Point Protocol (PPP) communications between the first node and the second node.

* * * * *